Feb. 1, 1955 A. L. LADD ET AL Re. 23,935

DRIER

Original Filed April 24, 1952 2 Sheets-Sheet 1

INVENTORS
MELVIN L. SPECKMAN
ALLAN L. LADD
BY John L. Woodward
ATTORNEY

DRIER

Original Filed April 24, 1952 2 Sheets-Sheet 2

INVENTOR.
MELVIN L. SPECKMAN
ALLAN L. LADD
BY John L. Woodward
ATTORNEY

United States Patent Office

Re. 23,935
Reissued Feb. 1, 1955

23,935

DRIER

Allan L. Ladd and Melvin L. Speckman,
Sleepy Eye, Minn.

Original No. 2,634,513, dated April 14, 1953, Serial No. 284,180, April 24, 1952. Application for reissue April 8, 1954, Serial No. 421,996

9 Claims. (Cl. 34—102)

Matter enclosed in heavy brackets [ ] appears in the original patent but forms no part of this reissue specification; matter printed in italics indicates the additions made by reissue.

This invention relates to a drier apparatus of the type wherein the same loose bulk material is continuously fed in the same predetermined cycle to a heated medium until it is dried to a desired point.

Heretofore the prior driers for loose bulk grain such as corn, oats, etc. used means where the loose bulk corn was not moved in the drier or where the drier devices moved the bulk corn only once through the apparatus. None of these devices uniformly dried the loose bulk corn.

The drier apparatus consists of a vertically extending chamber provided with a sloping floor formed completely around its lower portion for feeding material to be dried to a screw conveyor means mounted in a vertically extending tubular member positioned in the center of the chamber. The sloping floor is provided with a plurality of spaced apertures throughout its surface whereby heated air may be supplied to the chamber for drying the material therein. The screw conveyor lifts the material in the chamber from its bottom to adjacent the top of the chamber and delivers the material to a rotating disk having a plurality of fins which aids in dispersing the material such as loose bulk corn wheat, oat or grass seeds centrifugally to the wall of the chamber. Then the bulk corn, etc. is again fed by gravity to the lower end of the screw conveyor means which again elevates the loose bulk corn to the rotary disk in the top of the chamber. The loose bulk corn or the like is recirculated in the drier until it is dried to a desired moisture content, then the rotary disk can be raised above the outlet of the tubular member thereby feeding the dried bulk corn to an outlet means for the chamber.

It is an object of this invention to provide in a drier apparatus for drying bulk corn and other bulk seed grains, a chamber which feeds the corn by gravity to an elevating means which delivers the corn to a rotary disk means which throws the corn centrifugally to the wall of the chamber so that the corn will pass immediately and directly over heated air fed through a portion of the floor of the chamber as it is fed by gravity back to the elevating means.

It is another object of this invention to provide in a drier apparatus, a chamber and means for continuously recirculating bulk corn or other bulk seeds over heated air until dried to the desired moisture content, and means for dispersing the elevated bulk corn to the chamber so that it will come into direct contact with the heated air as it is fed into the chamber.

It is a still further object of this invention to provide in a drier apparatus for loose bulk corn and other bulk grain seeds, means for continuously recirculating the same corn over heated air until it is dried to the desired moisture content and means for automatically feeding the dried corn from the chamber after it has been dried.

Other and further objects of the invention will become apparent from the detailed description and the appended claims.

Figure 1:
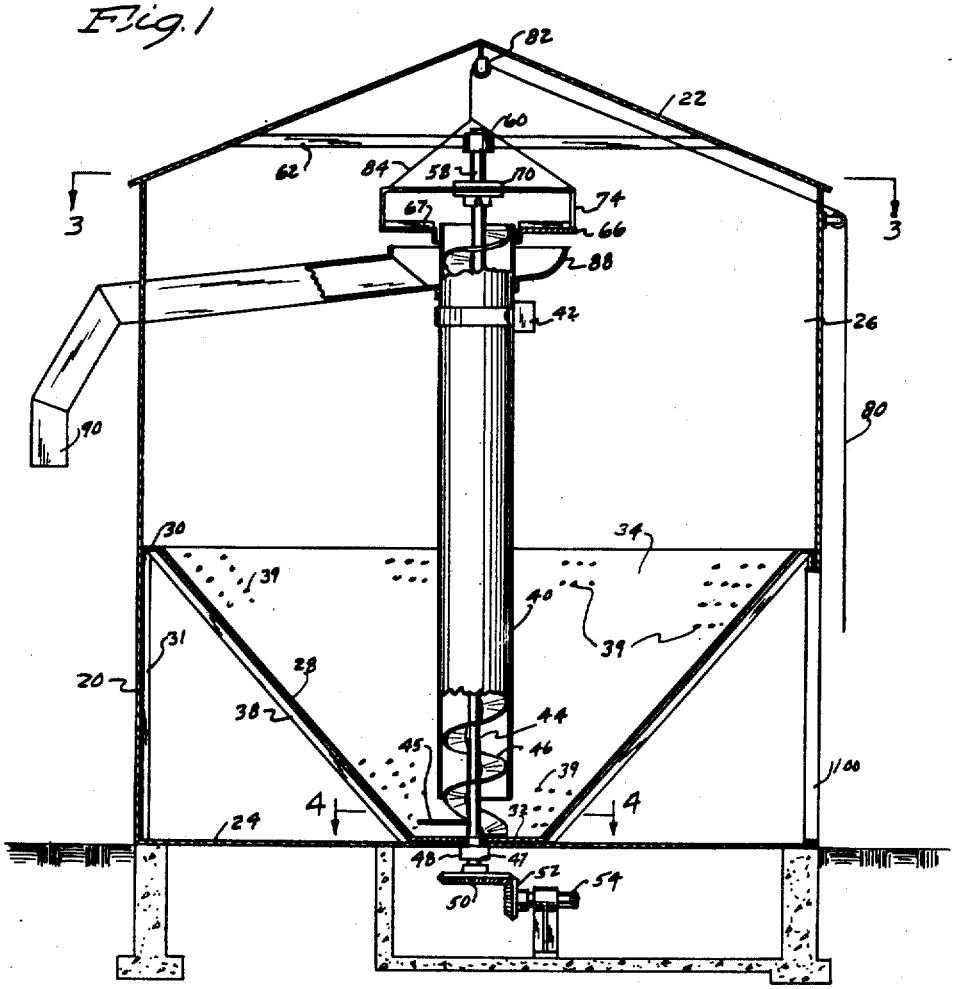
Figure 1 is a vertical sectional view of the drier.
Figure 2:
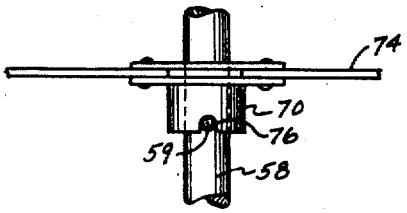
Figure 2 is a detailed view in elevation, parts broken away, of the locking means for the centrifugally dispersing means employed in the drier.
Figure 3:
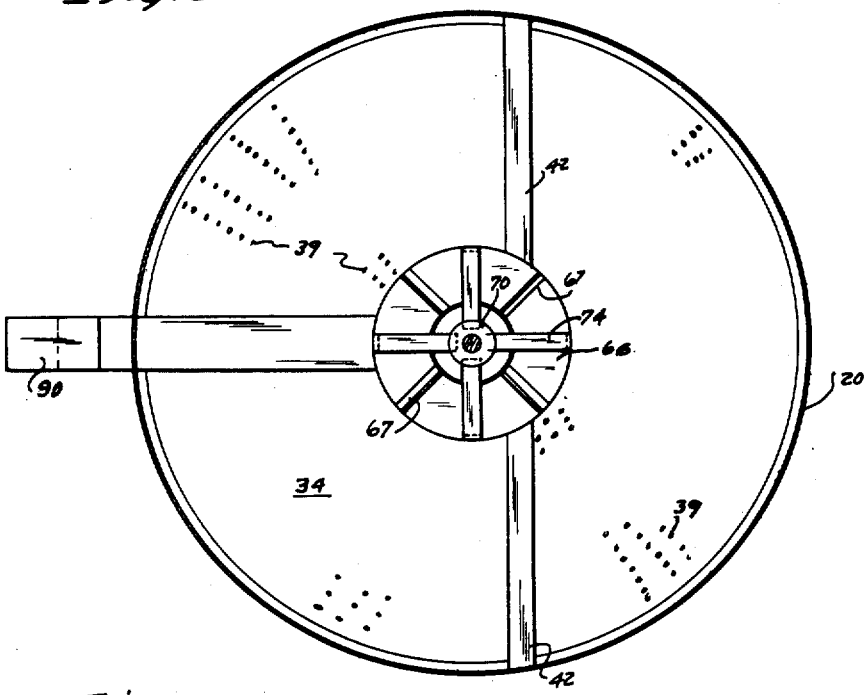
Figure 3 is a horizontal sectional view taken on line 3—3 of Figure 1.
Figure 4:
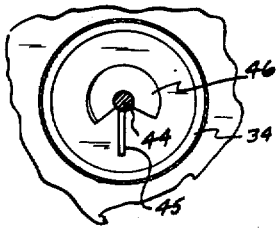
Figure 4 is a sectional view taken on line 4—4 of Figure 1.
Figure 5:
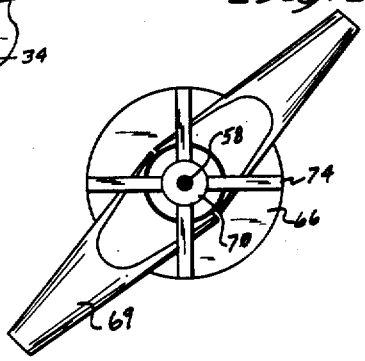
Figure 5 is a plan view of a modified form of dispersing means for the drier.

Referring in detail to the drawings 20 is a casing of cylindrical shape made of metal and/or other suitable material. A roof 22 covers the top of the housing 20 and a floor 24 of concrete or metal closes the bottom of the chamber 20.

The casing 20 is provided with a chamber 26, the upper portion of which is cylindrical in shape. A plurality of substantially V-shaped metal plates 28 are secured to a ring or collar 30 mounted on the wall of chamber 26 at about the mid-section of the chamber 26 with the base of the V-shaped plates secured to the ring 30 and the smaller end of the plates 28 abutting the inside edge of a cup 32 at the center of bottom 24 of chamber 26. The edges of the plurality of plates 28 overlap each other and are conveniently fastened to braces 38 extending from cup 32 adjacent the center of floor 24 to the ring 30 on the wall of chamber 26 forming a sloping floor 34 of inverted cone-shape for the lower portion of the chamber 26. The inverted cone-shaped floor 34 may be mounted in the chamber 26 so that it can be easily removed. Each of the plates 28 is provided with a plurality of spaced apart apertures 39 for supplying heated air to the chamber 26. The inverted cone-shaped floor 34 may be formed from one piece of metal.

A tubular member or pipe 40 is positioned in the center of chamber 26 and extends vertically from adjacent the center of the floor 24 to about a foot below the lower edge of the roof 22. The lower end of the pipe 40 is cut away providing an opening into the pipe 40. Lateral braces 42 positioned between the wall of chamber 26 and pipe 40 adjacent its upper end maintain the pipe 40 in the center of the chamber 26.

Disposed centrally and longitudinally through the tubular member 40 is a shaft 44. Carried by shaft 44 is a continuous spiral screw conveyor 46. The shaft 44 extends through the bottom 24 as at 47 and a bearing 48 is mounted thereon. A bevel gear 50 on shaft 44 meshes with a bevel gear 52 on a drive shaft 54 for an electric motor (not shown). Shaft 44 extends above the upper end of the pipe 40 as at 58 with a bearing 60 mounted thereon and braces 62 are positioned between the bearing 60 and the roof 22. A pin 59 is carried on the shaft portion 58 adjacent the top of pipe or tubular member 40.

A circular disk 66 is provided with a central opening and a small block 70 is provided with a hole in alignment with the opening in plate 66. The block 70 is secured to disk 66 by a plurality of arms 74, and these arms 74 position the block 70 above disk 66. The bottom of block 70 is provided with a lateral slot 76 for registering with a pin 59 on shaft portion 58. The disk 66 and block 70 are slidable over the top of shaft 58. The opening in disk 66 permits the disk 66 to be mounted around and slightly below the top of the pipe 40. The opening in block 70 allows slot 76 in block 70 to register with the pin 59 on shaft 58. The pin 59 registering with slot 76 in block 70 locks the rotary plate 66 to the shaft 44. A plurality of spaced apart fins 67 are secured to top of plate 66 for aiding in dispersing the corn from disk 66 to the wall of chamber 26. Instead of fins 67 a plurality of spout-like members 69 may be mounted on top of disk 66.

A cable 80 is trained over a pulley 82 supported to the roof 22 of the housing 20 with one end of the cable secured to a detachable frame 84 for disk 66 and the other end of the cable 80 extending through an aperture in the housing 20 to the outside. The frame 84 is detached from disk 66 when the conveyor 66 is rotated.

A spout member 88 is secured entirely around the pipe 40 a small distance below the opening at its top. The spout 88 communicates with an outlet duct 90 for flowing the dried material outside of the housing 20.

A relatively large opening 100 is provided in the lower portion of the housing 20. A conventional burner and blower-fan are appropriately connected with the opening 100 for supplying heated air to the housing 20 beneath the sloping or inverted cone-shaped floor 34.

It is the primary purpose of this drier apparatus to dry bulk corn having too much moisture content.

The housing 20 is fourteen feet high to the bottom edge of the roof 22 and is fourteen feet in diameter.

When it is desired to dry loose bulk corn, it is supplied to the chamber 26 through an appropriate opening adjacent the top of the housing 20. The chamber 26 is filled with corn to a suitable depth. Then the electric motor is switched on and through bevel gears 50—52, the shaft 44 is actuated thus rotating the screw conveyor 46. The bulk corn around the cut away portion of pipe 40 at the bottom of chamber 26 adjacent screw conveyor 46 is raised or elevated through pipe 40 to its opening at the top and the corn falls onto the rotary disk 66. The fins 67 on disk 66 aid in dispersing bulk corn centrifugally to the wall of the chamber 26. The inverted cone-shaped floor 34 feeds the bulk corn in chamber 26 by gravity to the cup 32 at the center of the bottom 24 adjacent the screw conveyor 46. It can be seen that all the corn in the chamber 26 can be cycled or circulated through the apparatus as many times as needed by means of the gravity feed in chamber 26 and the screw conveyor 46 in the tubular member 40. The radial breaker arm 45 on shaft 44 which works in the chamber 26 below the tubular member 40 prevents clogging of the material in the lower end of the chamber 26.

The rotary disk 66 with its fins 67 dispenses the corn to the wall of the chamber 26 insuring that all corn in the chamber 26 will pass directly over the surface of the inverted cone-shaped floor 34. The bulk corn passing directly over the inverted cone-shaped floor 34 will come into intimate contact with the heated air being fed to the chamber 26 through the plurality of apertures 39 in the sloping floor 34.

When the spout members 69 are used onto the rotary disk 66, the corn is gently fed to the wall of chamber 26.

If the seed corn were violently thrown off plate 66 against the wall of chamber 26, they might be damaged by such impact.

After the corn has been recirculated through the chamber 26 so that the corn is dried out sufficiently, then the cable 80 is pulled thus elevating the disk 66 on shaft 44 until the disk 66 is above top of pipe 40 and the block 70 is released from pin 59 on the shaft 44. Now the corn is fed by the screw conveyor 46 out of the top of pipe 40 into the spout 88. The corn flows from spout 88 to the outlet pipe 90. The loose corn flows through the outlet pipe 90 to a wagon or truck standing along side the outside of the housing 20.

The screw conveyor 46 and pipe 40 may be of different sizes as well as the chamber 26. The electric motor may be of different horsepowers.

It is to be understood that other changes in size, proportion and arrangement of the elements may be resorted to but all such changes are deemed to fall within the spirit of the invention and the scope of the appended claims.

What we claim as new is:

1. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a screw conveyor means positioned in the pipe extending from the bottom of the chamber to the top of the pipe, a rotary disk slidably mounted on the upper end of the shaft extending above the top of the pipe, the disk normally positioned below the upper end of the pipe, and means for locking the disk to said shaft, means for elevating the disk above the top of pipe thereby disengaging the locking means from the shaft, receiving means mounted around the outside of the pipe below its upper end for receiving the material being dried when the disk is elevated above the top of the pipe.

2. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a screw conveyor means positioned in the pipe extending from the bottom of the chamber to the top of the pipe, a rotary disk slidably mounted on the upper end of the shaft extending above the pipe, the disk normally positioned below the upper end of the pipe, and means for locking the disk to said shaft, means for elevating the disk above the top of pipe thereby disengaging the locking means from the shaft, receiving means mounted around the outside of the pipe below its upper end for receiving the material being dried when the disk is elevated above the upper end of the pipe and outlet means for feeding the material being dried from the receiving means to the outside of said chamber.

3. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber and extending from adjacent the pocket at the lower end of the chamber to adjacent the top of said chamber, a screw conveyor means positioned in the pipe extending from the bottom of the chamber to the top of the pipe, a rotary plate slidably mounted on the upper end of the shaft extending above the pipe, said plate normally positioned below the upper end of the pipe, and means for locking the plate to said shaft, a plurality of spout means mounted on the top of said plate extending to adjacent the wall of said chamber for conducting material from the plate to the chamber.

4. In a drying apparatus comprising a chamber, an inverted cone-shaped floor formed in the lower portion of the chamber provided with a plurality of spaced apart apertures, the inverted cone-shaped floor forming a small pocket on the bottom of the chamber, a pipe positioned in the center of said chamber extending from adjacent the pocket on the bottom of the chamber to adjacent the top of the chamber, a screw conveyor means mounted in the pipe extending from the bottom of said pocket to the top of the pipe, a rotary plate mounted on the upper end of the shaft extending above the top of the pipe, the plate normally positioned below and around the upper end of the pipe, means for locking the plate to said shaft, means mounted on the top of said rotary plate for aiding in throwing the material being dried outwardly to the wall of said chamber, means for disengaging the locking means from the shaft and for elevating the plate above the top of said pipe and means positioned below the upper end of said pipe for receiving material being fed through pipe by the screw conveyor when the plate is elevated above the top of said pipe.

*5. In a drier apparatus comprising a chamber, a sloping floor extending entirely around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the bottom of the chamber to adjacent the top of said chamber, a screw conveyor means including a shaft positioned in the pipe extending from the bottom of the chamber to the top of the pipe, a rotary scattering means slidably mounted on the upper end of the shaft, the rotary scattering means normally positioned below the upper end of the pipe, means for releasably locking the rotary scattering means to said shaft, means for elevating the rotary scattering means above the top of the pipe thereby unlocking the scattering means from the shaft, and receiving means positioned below the upper end of the pipe receiving the material being dried in the chamber when the scattering means is elevated above the upper end of the pipe.*

*6. In a drier apparatus comprising a chamber, a sloping floor extending entirely around the entire lower portion of the chamber provided with apertures, the floor sloping toward the lower end of the chamber forming a small pocket on the bottom of the chamber, a pipe positioned in the chamber extending from adjacent the pocket at the bottom of the chamber to adjacent the top of said chamber, elevating means positioned in the pipe extending from the bottom of the chamber to the top of the pipe,*

*rotary scattering means normally mounted in a first position on the upper end of the elevating means for receiving the material for delivery to the chamber for recirculation in the elevating means, means for releasably locking the scattering means to the elevating means, means positioned in the chamber below the upper end of the pipe for delivering the material to the outside of the chamber, means for moving the scattering means to a second position above the upper end of the pipe thus unlocking the scattering means from the elevating means, the elevating means feeding the material to said delivering means when the scattering means is moved above the pipe.*

*7. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of said chamber, a conveyor means positioned in the pipe extending from the bottom of the chamber to the top of the pipe, a rotary scattering means slidably mounted on the upper end of the shaft extending above the top of the pipe, the rotary scattering means normally positioned with respect to the upper end of the pipe for receiving material being elevated by the conveyor means, and means for locking the rotary scattering means to said shaft, means for elevating the rotary scattering means above the top of the pipe thereby disengaging the locking means from the shaft, receiving means mounted around the outside of the pipe below its upper end for receiving the material being dried when the rotary scattering means is elevated above the top of the pipe.*

*8. In a drier apparatus comprising a chamber, a sloping floor extending around the entire lower portion of the chamber provided with a plurality of spaced apart apertures, the floor sloping toward the center of the lower end of the chamber forming a relatively small pocket at the bottom of said chamber, a pipe positioned in the chamber extending from adjacent the pocket at the lower end of the chamber to adjacent the top of the chamber, a conveyor means positioned in the pipe extending from the bottom of the chamber to the top of the pipe, a rotary scattering means slidably mounted on the upper end of the shaft extending above the pipe, the rotary scattering means normally positioned with respect to the upper end of the pipe for receiving material being elevated by the conveyor means, and means for locking the rotary scattering means to said shaft, means for elevating the rotary scattering means above the top of the pipe thereby disengaging the locking means from the shaft, receiving means mounted around the outside of the pipe below its upper end for receiving the material being dried when the rotary scattering means is elevated above the upper end of the pipe and outlet means for feeding the material being dried from the receiving means to the outside of said chamber.*

*9. In a drying apparatus comprising a chamber, an inverted cone-shaped floor formed in the lower portion of the chamber provided with a plurality of spaced apart apertures, the inverted cone-shaped floor forming a small pocket on the bottom of the chamber, a pipe positioned in the center of said chamber extending from adjacent the pocket on the bottom of the chamber to adjacent the top of the chamber, a conveyor means mounted in the pipe extending from the bottom of said pocket to the top of the pipe, a rotary scattering means mounted on the upper end of the shaft extending above the top of the pipe, the rotary scattering means positioned with respect to the upper end of the pipe for receiving material being elevated by the conveyor means, means for locking the rotary scattering means to said shaft, means for disengaging the locking means from the shaft and for elevating the rotary scattering means above the top of said pipe, and means positioned below the upper end of said pipe for receiving material fed through the pipe by the conveyor means when the rotary scattering means is elevated above the top of said pipe.*

References Cited in the file of this patent or the original patent

UNITED STATES PATENTS

| | | |
|---|---|---|
| 1,136,933 | Cameron | Apr. 27, 1915 |
| 2,262,190 | Meade | Nov. 11, 1941 |
| 2,388,399 | Forster et al. | Nov. 6, 1945 |
| 2,662,821 | Muench | Dec. 15, 1953 |

FOREIGN PATENTS

| | | |
|---|---|---|
| 11,946 | Great Britain | 1893 |
| 54,755 | Denmark | May 16, 1938 |